United States Patent [19]

Stover et al.

[11] E Patent Number: Re. 32,453

[45] Reissued Date of Patent: Jul. 7, 1987

[54] SHOPPING CART WITH BABY SEAT

[75] Inventors: Don A. Stover, Oklahoma City; Clarence W. Upshaw, Tuttle; Warren N. Norman, Oklahoma City, all of Okla.

[73] Assignee: UNR Industries, Inc., Chicago, Ill.

[21] Appl. No.: 773,561

[22] Filed: Sep. 9, 1985 (Under 37 CFR 1.47)

Related U.S. Patent Documents

Reissue of:

[64] Patent No.: 4,423,882
Issued: Jan. 3, 1984
Appl. No.: 376,593
Filed: May 10, 1982

[51] Int. Cl.[4] ..... B62B 3/00

[52] U.S. Cl. ..... 280/33.99 B; 220/340; 280/33.99 H

[58] Field of Search ..... 280/33.99 B, 33.99 F, 280/33.99 R, 33.99 A, 33.99 H, DIG. 4; 220/244, 324, 340; 297/353

[56] References Cited

U.S. PATENT DOCUMENTS

| | | | |
|---|---|---|---|
| Re. 25,616 | 7/1964 | Stanley | 280/33.99 B |
| 3,437,176 | 4/1969 | Ruttenberg et al. | 280/33.99 B |
| 3,503,622 | 3/1970 | Romero | 280/33.99 B |
| 3,645,554 | 2/1972 | Von Stein et al. | 280/33.99 R |
| 3,787,063 | 1/1974 | Oliver | 280/33.99 B X |
| 3,789,957 | 2/1974 | Close | 280/33.99 B |
| 3,815,932 | 6/1974 | Ruger | 280/33.99 F |
| 4,067,591 | 1/1978 | Celms | 280/33.99 S |
| 4,116,456 | 9/1978 | Stover et al. | 280/33.99 B |
| 4,118,044 | 10/1978 | Celms | 280/33.99 F |
| 4,273,346 | 1/1981 | Rehrig | 280/33.99 F |
| 4,560,180 | 12/1985 | Ulmer | 280/33.99 B |

FOREIGN PATENT DOCUMENTS 457154 7/1968 Switzerland

*Primary Examiner*—John J. Love
*Assistant Examiner*—Michael Mar
*Attorney, Agent, or Firm*—Clement and Ryan

[57] ABSTRACT

A shopping cart with a baby seat at the rear of the cart. The front wall of the seat, against which the infant or child leans, has an upright, closed position and an open position. The width of the baby seat front wall is less than the width of the main lading-carrying basket of the shopping cart, so that it can be swung down from its upright, closed position in the forward direction, when desired, to rest on the bottom wall of the basket to increase the capacity of the shopping cart by adding the space enclosed by the side and rear walls of the baby seat. A latch holds the baby seat front wall in its upright, closed position and preferably cooperates with a lost motion hinge at the bottom of the wall, and in its preferred form includes at least one cammed latch member that slides up across a ramp or slide member to (1) move the front wall upward as it approaches its closed position, and then (2) drop the front wall down to seat it in its closed position. The latch can be released by reversing this procedure. The preferred hinge includes a stud carried at each end of the hinge pintle that extends in a transverse direction from the pintle at an obtuse angle, preferably 135°, to the plane of the baby seat front wall. This construction means that the hinge pintle of the hinged front wall is retained in place without special connections, after the baby seat has been fixedly secured to the rest of the shopping cart.

22 Claims, 6 Drawing Figures

SHOPPING CART WITH BABY SEAT

Matter enclosed in heavy brackets [ ] appears in the original patent but forms no part of this reissue specification; matter printed in italics indicates the additions made by reissue.

FIELD OF INVENTION

This invention relates to a shopping cart, and more particularly such a cart with a baby seat at the rear thereof.

BACKGROUND OF THE INVENTION

Shopping carts for use by customers in grocery stores, discount stores, hardware stores and the like have been in use for more than 40 years. For about 20 years, one widely used type of shopping cart, commonly known as an over-the-counter cart, has had an elevated frame for supporting the main lading-carrying basket just above the top of the check-out counter as the cart is pushed through the check-out station.

From the very first use of over-the-counter carts, such carts (like shopping carts of virtually every other type) have been provided with a baby seat compartment at and facing the rear of the cart, near the handle so that a parent can carry an infant or young child in the cart at the same time the cart is being used to accumulate purchases as it is pushed around the store. Such a seat is ordinarily arranged to permit an infant or young child to face the parent while sitting in the baby seat.

The walls of shopping carts in widest use are formed of an array of interconnected wire elements, and these walls define the main load or lading-carrying space. In carts having the main lading-carrying basket elevated just above the top of the check-out counter, the space defined by the walls of the basket is customarily closed off at its front end by a hinged gate that can be lowered by the check-out clerk, when desired, to provide access to the articles contained in the basket of the cart.

In the usual shopping cart that is of the over-the-counter type described and includes a baby seat, the front wall of the seat, against which the infant or young child leans when seated in the cart, is constructed so as to remain in a fixed, generally vertical position at all times. When the baby seat is unoccupied, the space defined by the seat can be used to hold articles purchased by the user of the cart, in order to augment the load-carrying capacity of the cart by that additional space. However, when the cart is pushed up to the check-out counter, the articles piled in the baby seat space are not easily accessible to the check-out clerk (who ordinarily stands at the forward end of the shopping cart in front of the cash register) because the fixed, generally vertical front wall of the baby seat interposes a barrier over which it is difficult for the check-out clerk to reach.

This disadvantage has been recognized for as long as the [over-the counter] *over-the-counter* shopping carts have been used, but until applicant developed the shopping cart of this invention no one has been able to solve this problem.

SUMMARY OF THE INVENTION

The shopping cart of this invention includes a basket defining a main lading-carrying space that is supported on an elevated frame carried by a wheeled chassis. The basket has a hinged front gate adapted to be swung down in the forward direction to provide ready access to the main lading-carrying space, and means to hold the same at other times in an upright position. The basket is preferably pivotally secured at its rear end portion to the elevated frame to either rest on the front portion of that frame when the basket is in its operative position or to be swung upward into a generally upright position when in its storage position.

A baby seat is secured to the rear portion of the elevated frame of the cart. The baby seat has a front wall that is of lesser width [then] *than* the lading-carrying basket [but of greater width than the distance between the side walls of the baby seat compartment], and is hinged at its bottom edge portion to swing down in the forward direction to rest on the bottom wall of the basket when desired. The front wall of the baby seat functions as a backrest for the infant.

Latch means provide a positive holding of the baby seat front wall to secure the wall against movement in either the forward or rearward direction from an upright, closed position whenever an infant or young child is seated *in* the seat[. ; the means is releasable when desired to swing the front wall down] to rest on the bottom wall of the basket to increase the lading-carrying capacity of the cart.

The hinge at the bottom edge portion of the front wall of the baby seat is preferably a lost motion hinge, with the latch means including a cam member that moves the front wall upward when it approaches its closed position and then drops the front wall down to seat it in its closed position.

The baby seat may be fabricated separately from the remainder of the cart. In such case, each end of the pintle of the hinge at the bottom edge of the baby seat front wall preferably carries a stud extending at about 90° to the axis of the hinge pintle and away from the bottom edge of the front wall at an obtuse angle (preferably about 135°) to the plane of the baby seat front wall. In this preferred form, the hinge at the bottom edge of the front wall of the baby seat includes means defining an elongated slot to receive the stud-bearing ends of the hinge pintle, so that the front wall may be incorporated in the baby seat before it is assembled to the elevated frame of the cart, and be prevented from being removed from those hinge slots after the baby seat is secured to the elevated frame.

BRIEF DESCRIPTION OF THE DRAWINGS

The invention will now be described by reference to the attached drawings, in which.

DETAILED DESCRIPTION OF ONE EMBODIMENT OF THE INVENTION

A detailed description of one embodiment of the present invention follows.

General Construction Of Shopping Basket

Figure 1:
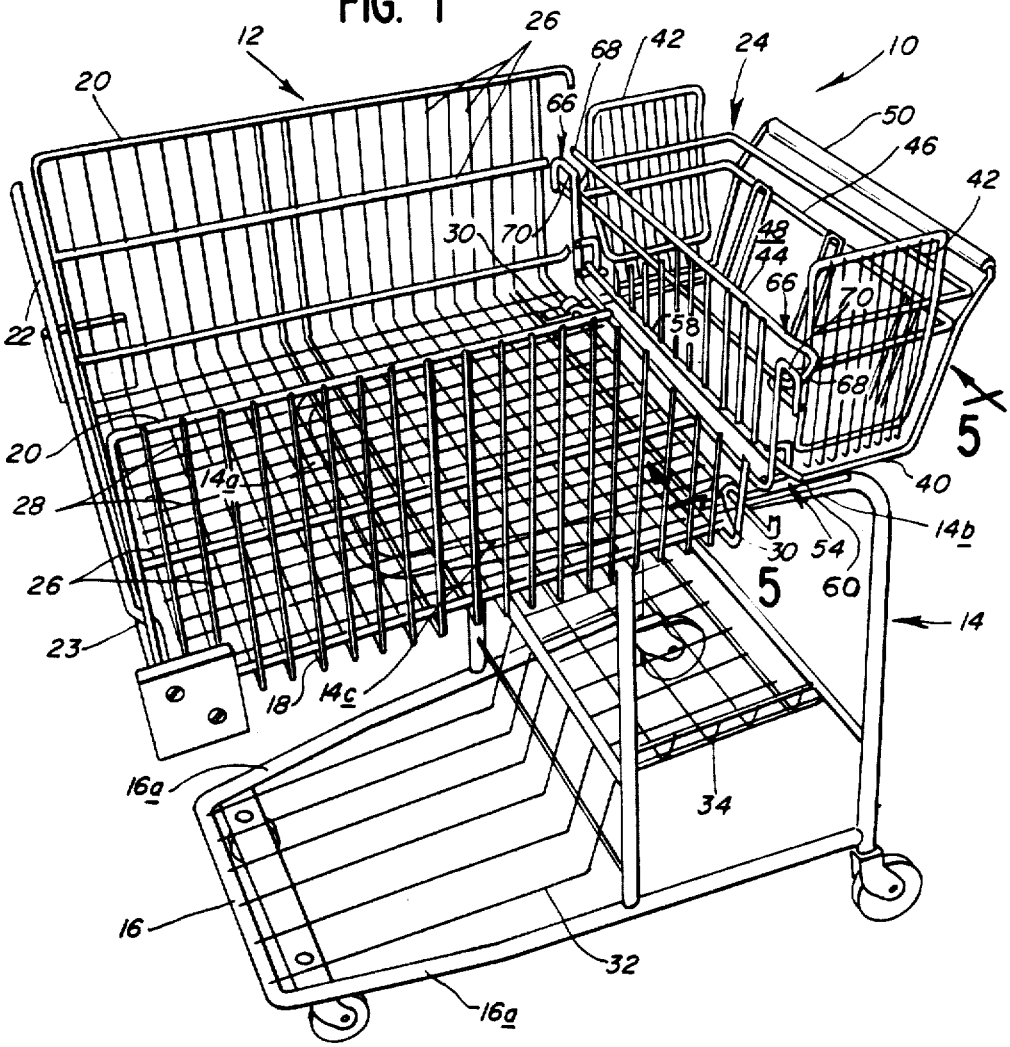
FIG. 1 is a perspective view of one embodiment of the shopping cart of this invention, with rear portions of the two opposed side walls of the main lading-carrying space broken away for clarity.

FIG. 1 is a perspective view of shopping cart 10, which is one embodiment of the present invention.

In general construction, basket 12, which defines a main lading-carrying space, is mounted on elevated frame 14 carried by wheeled chassis 16. Frame 14 includes a front portion 14a, a rear portion 14b and a side portion 14c. Basket 12 includes bottom wall 18, two opposed side walls 20, and gate 22 at the front end of the cart.

Gate 22 is hinged at its bottom edge to permit it to be swung down in the forward direction, when desired, to provide ready access by the check-out clerk to the lading-carrying space within basket 12 when shopping cart 10 is rolled forward to bring the basket just above the top of the check-out counter as the cart is pushed through the station. Means 23, in the form of a deformed or offset wire member, functions to hold gate 22 in an upright position when a barrier is desired to help define the lading-carrying space of basket 12.

The rear of basket 12 facing upon the baby seat 24 (located at the rear of cart 10) has no wall and is open. Walls 18 and 20 and front gate 22, as is true of most shopping charts, are formed of an array of interconnected wire elements such as elements 26 of side walls 20 and elements 28 of bottom wall 18.

Bottom wall 18 is secured to elevated frame 14. In the embodiment shown, bottom wall 18 is pivotally secured at its rear end portion to rear portion 14b of the elevated frame through hinges 30. Bottom wall 18 is shown in FIG. 1 resting on front portion 14a of the elevated frame when the basket is in its operative position, ready to receive groceries or other items as the shopping cart is pushed around in a store. Another showing of basket 12 in this position is provided in the fragmentary sectional view of FIG. 5.

Side members 14c of elevated frame 14 are flared outwardly from front to back. Side members 16a of chassis 16 are similarly flared outwardly from front to back. Auxiliary platforms 32 and 34, on which additional items may be stored by the user of the cart if desired, rise slightly from front to back. The construction described facilitates the nesting of shopping carts 10 in collapsed condition, as described below.

General Construction Of Baby Seat

Baby seat or compartment 24 is fixedly secured to rear portion 14b of elevated frame 14. The baby seat includes bottom wall 40, two opposed side walls 42, front wall 44 and rear wall 46. The rear wall defines two openings 48 to receive the legs of an infant or young child seated in the baby seat. Bottom wall 18 of basket 12 and bottom wall 40 of baby seat 24 are, in the embodiment shown, at the same general level.

The cart is propelled by handle 50 at the rear thereof, so that the person pushing the cart faces the infant or child, as is customary in most shopping carts, who is seated in the baby seat. As is also customary, the walls of the baby seat compartment are formed of an array of interconnected wire elements, in much the same manner as are the walls of basket 12.

Figures 2, 3, 4:
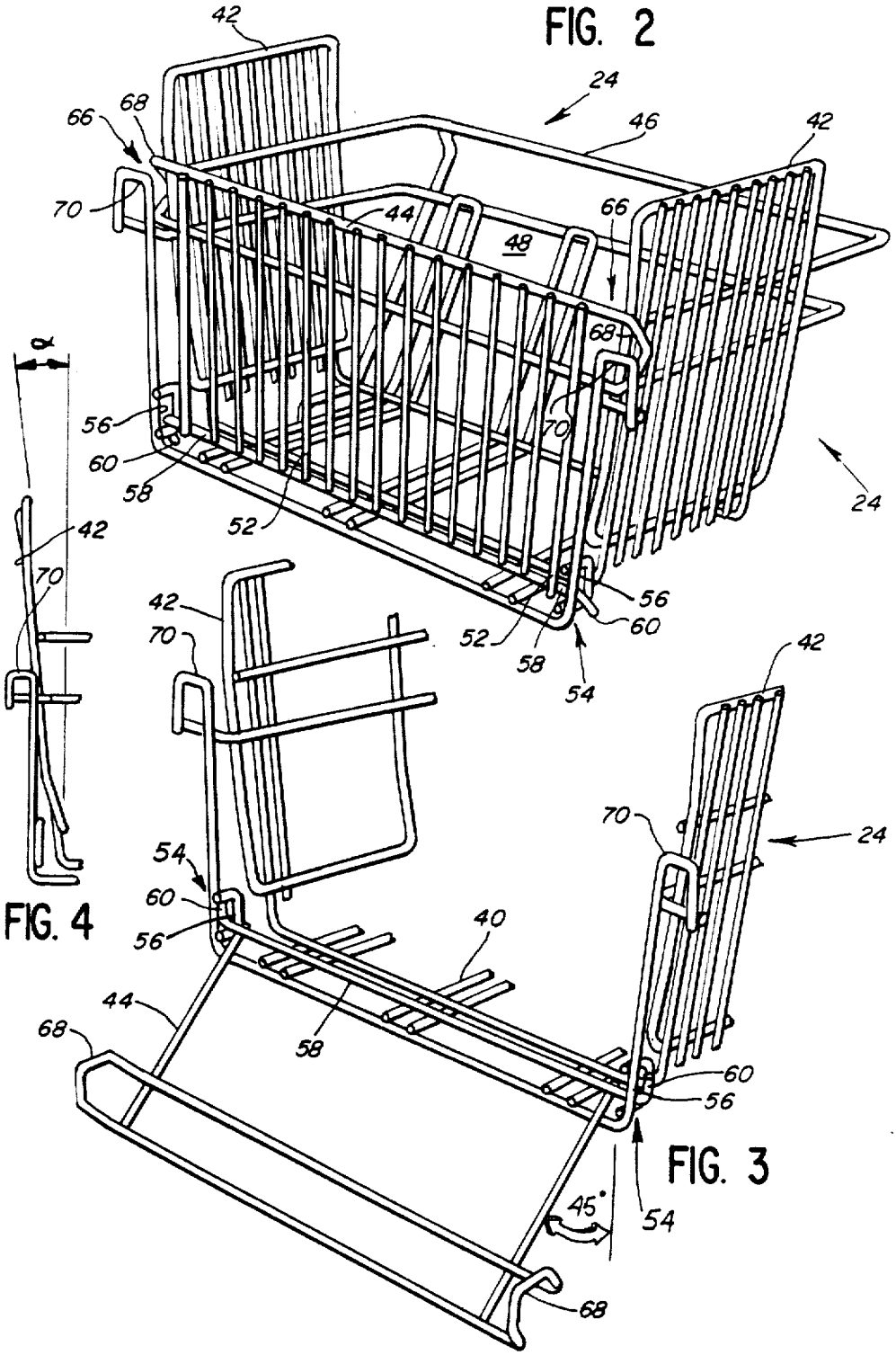
FIG. 2 is a perspective view of the baby seat that is included in the embodiment of FIG. 1, with the bottom wall of the baby seat largely omitted for clarity.
FIG. 3 is a fragmentary view of the baby seat of FIG. 2, with the front wall of the baby seat shown in the position it occupies just after the pintles of the bottom hinge of that wall have been inserted in the elongated slots in which they are seated when the shopping cart is in use, and before the baby seat has been secured to the cart frame.
FIG. 4 is a fragmentary front elevation of the baby seat of FIG. 3 showing the corner of the baby seat that is seen on the left-hand side of FIG. 3, with the hinged baby seat front wall omitted for clarity.
Figure 5:
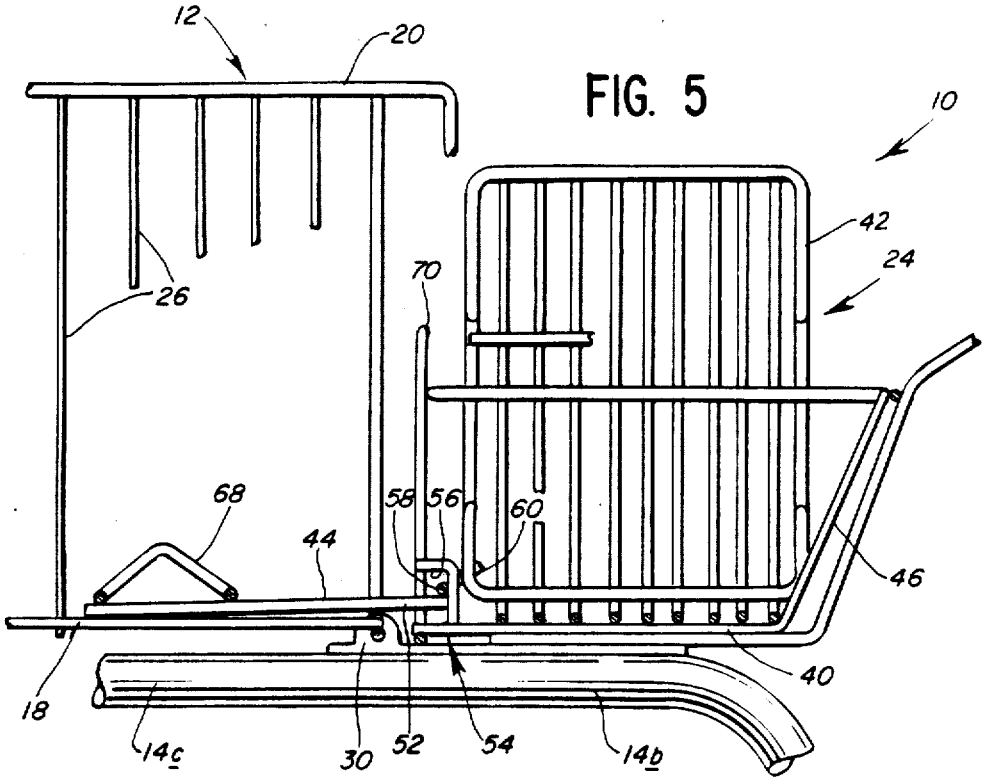
FIG. 5 is a fragmentary sectional view of the shopping cart basket and baby seat showing the basket in operative position and the baby seat in open position, with portions of both the basket and the seat broken away for clarity, taken along line 5—5 in FIG. 1.
Figure 6:
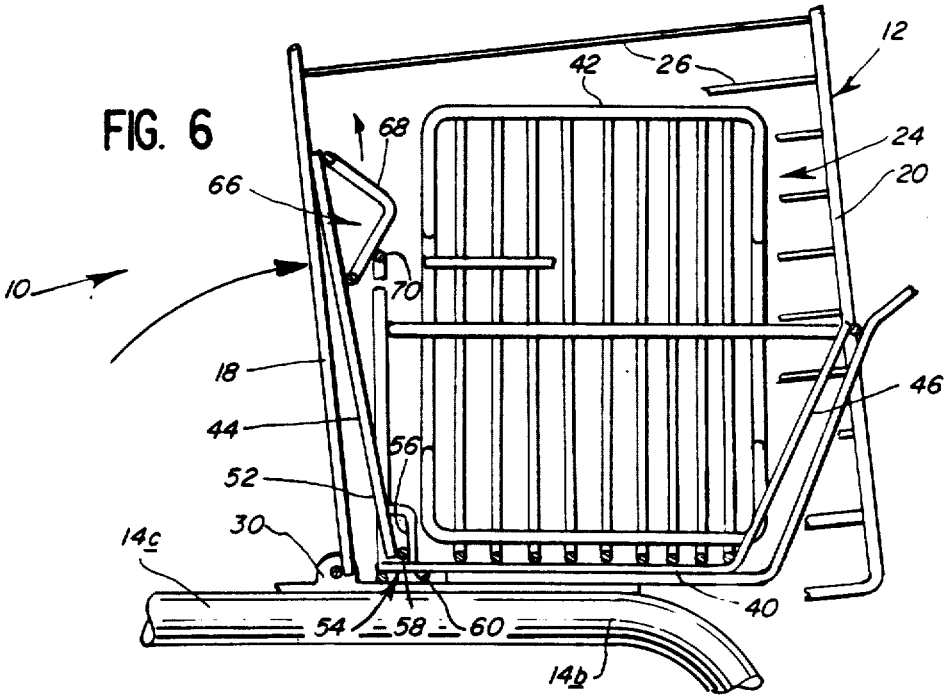
FIG. 6 is a fragmentary sectional view similar to FIG. 5 but with the shopping cart basket shown elevated very nearly into its storage position.

Front wall or backrest 44 of baby seat 24 has an upright, closed position in which it is generally at right angles to bottom wall 40 (as shown in FIG. 1) and an open position in which it is generally parallel to bottom wall 40 (best seen in FIG. 5). The width of front wall 44 is less than the width of basket 12, which permits the front wall to be swung down from its closed position in the forward direction, when desired, to rest in its open position on bottom wall 18 of basket 12 and thereby augment the main lading-carrying space by the space enclosed by the walls of the baby seat. As best seen in FIGS. 2, 5 and 6, bottom edge portion 52 of front wall 44 is hinged at 54 to bottom wall 40 of baby seat 24 for this purpose.

In the embodiment shown, each side wall 42 of baby seat 24 slants upwardly and outwardly at an angle to the vertical. This allows a plurality of baby seats to be stacked in nested fashion, one within the other, when they have been separately fabricated and are being stored temporarily before each is attached to the rest of a shopping cart.

Hinge For Baby Seat Front Wall

As shown, at least one end of hinge pintle 58 includes a stud 60 that extends transverse to the longitudinal axis of the hinge pintle, preferably at 90° to that axis. Means are provided at the other end of the hinge pintle to prevent movement of stud 60 out of slot 56 after it has been seated therein and baby seat 24 has been fixedly secured to elevated frame 14b. For this purpose, the embodiment shown includes a specially shaped and oriented stud 60 at the far end of hinge pintle 58 (in FIG. 1) as well as at the near end. Each stud 60 extends transverse to the longitudinal axis of hinge pintle 58 (in the embodiment shown, at right angles to that axis) and away from the bottom edge of baby seat front wall 44 at an obtuse angle to the plane of that wall (in the embodiment shown, at about 135°). Thus, so long as slot 56 is narrower than the length of studs 60, the studs can not slide out of the slots in which the hinge pintle is seated once the baby seat has been fixedly secured to the elevated frame.

The importance of studs 60 is explained in more detail below in the section on assembling the cart and baby seat when the latter is separately fabricated.

As has been explained above, in the embodiment of the shopping cart of this invention disclosed herein, the hinge pintle is carried by the baby seat front wall and the vertical elongated slots in which it is received are defined by portions of the opposed side walls of the baby seat. This arrangement of parts can if desired be reversed.

Latch Means For Baby Seat Front Wall

Latch means 66 is provided for holding baby seat front wall 44 in its upright, closed position whenever an infant or young child is seated in the seat. Latch means 66 includes, in the embodiment disclosed, a cammed latch member 68 mounted at each end of front wall 44.

As best seen in FIGS. 5 and 6, when baby seat front wall 44 is swung upward about hinge 54, cam member 68 strikes ramp or slide member 70 and slides up across that member. As cam member 68 slides across member 70, front wall 44 approaches its uright, closed position, and in doing so is moved upward until cam 68 clears slide 70. At this time, front wall 44 drops down to be seated in its closed position, with cam member 68 confined between slide means 70 and baby seat end wall 42.

When no infant or child is seated in baby seat 24 and it is desired to swing front wall 44 down to rest on bottom wall 18 of basket 12 to increase the lading-carrying capacity of the shopping cart, latch means 66 may be readily released. This is accomplished simply by lifting baby seat front wall 44 upward to move the ends of hinge pintle 58 up in vertical elongated slots 56, and at the same time to move cam member 68 upward until it clears stop means 70, which permits wall 44 to be swung forward and down. Bottom wall 18 of basket 20 and bottom wall 40 of baby seat 24 are, in the embodiment shown, at the same general level.

As explained, in the embodiment disclosed cam latch member 68 is carried by baby seat front wall 44 at each end thereof, and cooperating slide member 70 is provided at the front end of the corresponding baby seat side wall 42. If desired, the members on which the cammed latch means and stop means are located may be reversed.

Cam members 68 provide another advantage in this embodiment in addition to acting as a part of latch means 66. Side walls 42 of the baby seat, especially when a child is seated in the seat, tend to bend outward, since the vertical wire elements comprising the side walls are quite long and of relatively small diameters in comparison to their lengths. When the baby seat front wall 44 is in its upright, closed position, cam members 68 extend rearward adjacent the two opposed side walls 42 of the baby seat and outwardly thereof. Because of their inverted V-shape and relatively large diameters in comparison to the distance they extend rearward from the top portion of wall 44, with which they are integrally formed, cam members 68 provide quite rigid stops restricting outward lateral movement of the baby seat side walls.

Nesting of Baskets For Storage

Various expedients are employed with shopping carts of different types to facilitate assembling the carts in a special area off to one side in a store, where they stand ready to be used by customers. The method employed typically involves, as is true with the present invention, one form or another or nesting a plurality of carts together through telescoping the carts with some parts in collapsed condition.

In the embodiment shown, the hinging of basket 12 at hinges 30 as described above permits the basket to rest on front portion 14a of elevated frame 14 in the operative position of the basket, and to be swung up approximately 90° to a nested or storage position when desired. In this position basket bottom wall 18 is generally upright, and baby seat 24 (which is not as wide as the basket) is nested in the basket.

Shopping cart 12 as shown in FIG. 6 is very nearly in its collapsed condition. When cam member 68 is moved up over the slide member 70 until baby seat front wall 44 is brought into a vertical position, bottom wall 18 of basket 12 will also be in a substantially vertical position. In this collapsed position, the storage space for a plurality of shopping carts standing ready for use in a store can be conserved by nesting one elevated frame 14 and chassis 16 in the frame and chassis of another cart.

It will be noted from FIG. 6 that when cart 10 is placed in its fully collapsed condition by completing the swinging of basket 12 up into its final vertical position, baby seat front wall 44 will automatically be moved into its upright, closed condition. The baby seat will thus be put [atuomatically] *automatically* in condition for accepting an infant or child as soon as the cart is removed from its nesting with other carts and the basket is lowered into its operative position resting on front portion 14a of elevated frame 14.

Separately Fabricated Baby Seat

Manufacture of the shopping cart of the type described typically proceeds in steps, with wheeled chassis 16 and elevated frame 14 being fabricated separately from basket 12 and baby seat 24 and the various other components then being brought together in a final assembly step. The preferred lost motion hinge 54 that has been described above is especially advantageous in this type of assembly, since it means that the components may be readily assembled in final form with the hinge in immediate operative position without the use of any special or extra fasteners to secure the hinge pintle in place.

The operation of hinge pintle 58 with studs 60 carried at each end, together with the associated vertical elongated slots 56, has been described above by reference to FIGS. 2, 5 and 6. As is shown in those Figures, the special shape and orientation of studs 60 prevent hinge pintle 58 from moving out of slots 56 after the pintle has been seated in those slots and baby seat 24 is fixedly secured to frame 14. Each stud 60 extends transverse to the longitudinal axis of hinge pintle 58 (in the embodiment shown, at right angles to that axis) and away from the bottom edge of baby seat front wall 44 at an obtuse angle to the plane of that wall (in the embodiment shown, at about 135°). Thus, so long as slot 56 is narrower than the length of studs 60, the studs can not slide out of the slots in which the hinge pintle is seated once the baby seat has been fixedly secured to the elevated frame.

Assembly of Cart And Separate Baby Seat

Before baby seat 24 is attached to shopping cart frame 14, specially shaped and oriented studs 60 at the ends of hinge pintle 58 can be slipped through elongated slots 56 by positioning wall 44 at an angle of about 45° to the vertical axis of the slots. This is best seen in FIG. 3. For clarity, most of the array of interconnected elements that make up baby seat side wall 42 and front wall 44 are omitted in that Figure.

The procedure followed in assembling baby seat 24 to the embodiment of shopping cart 10 disclosed is as follows. Hinge pintle 58 with stud 60 at each end thereof is first seated in elongated slots 56 by positioning baby seat front seat 44 at the 45° angle just mentioned, and then inserting the pintle ends in the slots. This insertion is carried out one at a time, with the hinge pintle moved axially off to one side as the first stud 60 is inserted in its associated slot 56, then moved back to a center position as the second stud is inserted in its associated slot. Front wall 44 is then swung upward through approximately 135°, to slide cam members 68 over slide means 70 and drop wall 44 down into its vertical, upright position as shown in FIG. 2. The baby seat is then fixedly secured to rear portion 14b of elevated frame 14.

As seen in FIG. 5, with the movement of baby seat front wall 44 restricted by bottom wall 18 of basket 12, hinge pintle 58 can not be rotated back through 135° as it was when front wall 44 was being assembled to the rest of the baby seat, and thus cannot be removed from elongated slots 56 without disassembling the shopping cart. As seen in FIGS. 2 and 5, rotation of baby seat front wall 44 through the 90° of movement that are available to it after the baby seat is secured to elevated frame 14 moves studs 60 through a progression of positions in any one of which removal of hinge pintle 58 from slots 56 is prevented.

This preferred method of assembly of front wall 44 to the rest of baby seat 24 and shopping cart 10 as a whole is not only quick and easy, but as already mentioned above makes it unnecessary to employ any special fasteners or other components to hold the hinged front wall securely in place.

The above detailed description has been given for ease of understanding only. No unnecessary limitations should be understood therefrom, as modifications will be obvious to those skilled in the art.

We claim:

1. A shopping cart which comprises:

(a) a wheeled chassis;

(b) an elevated frame carried by said chassis;

(c) a basket defining a main lading-carrying space, said basket including a bottom wall secured to said elevated frame, two opposed side walls, and a gate at the front end of said cart, and having an open end at the rear thereof;

(d) a baby seat compartment secured to the rear portion of said elevated frame, said baby seat including a bottom wall, two opposed side walls, a front wall having an upright, closed position and an open position, the width of said baby seat front wall being less than the width of said lading-carrying basket [said hinge for said baby seat front wall being located at a level at least as high as the bottom walls of said lading-carrying basket, ] said front wall being hinged at its bottom edge portion to permit it to be swung down from its closed position in the forward direction, when desired, to rest on the bottom wall of said lading-carrying basket, *said hinge for said baby seat front wall being located at a level at least as high as the bottom wall of said lading-carrying basket* and a rear wall defining two openings to receive the legs of a baby seated in said baby seat; and (e) latching means for providing a positive holding of said baby seat front wall to secure the same against movement in either the forward or rearward direction from its said upright, closed position while a baby is seated in the seat, said means being releasable when it is desired to swing said front wall down to rest on the bottom wall of said basket to increase the lading-carrying capacity of the shopping cart.

2. The shopping cart of claim 1 in which the bottom wall of said basket that defines the main lading-carrying space is at the general level of the bottom wall of said baby seat.

3. The shopping cart of claim 1 in which:

said hinge at the bottom edge portion of the front wall of the baby seat is a lost motion hinge including an elongated slot oriented generally vertically to receive the hinge pintle at each end of the bottom edge portion of said front wall, and said latch means for holding the baby seat front wall in its said upright, closed position includes at least one cammed latch member that moves said front wall upward when it approaches its said closed position as it is swung up from its open position, and then drops said front wall down to seat it in its said closed position.

4. The shopping cart of claim 3 in which said at least one cammed latch member is carried by said baby seat front wall and a cooperating slide member is provided at the front end of the corresponding side wall of the baby seat.

5. The shopping cart of claim 1 in which:

said basket that defines the main lading-carrying space of the cart has an operative position and a storage position.

said bottom wall of the basket is pivotally secured at its rear end portion to said elevated frame to rest on the front portion of said frame when the basket is in its said operative position, and the bottom wall of said basket is at the general level of the bottom wall of said baby seat when the basket is in its said operative position.

6. The shopping cart of claim 5 in which said bottom wall of said basket that defines the main lading-carrying space of the cart is pivotally secured to said elevated frame at the rearmost portion of said basket.

7. The shopping cart of claim 5 in which the side walls of said shopping cart basket are spaced more widely than the side walls of said baby seat, so that the basket can be swung from its said operative position upward about its said pivot approximately 90° to its said storage position, in which position the basket bottom wall is generally upright and the baby seat is nested within the basket.

8. The shopping cart of claim 7 in which said hinge at the bottom edge portion of the front wall of the baby seat is a lost motion hinge including an elongated slot oriented generally vertically.

9. The shopping cart of claim 7 in which:

said hinge at the bottom edge portion of the front wall of the baby seat is a lost motion hinge including an elongated slot oriented generally vertically to receive the hinge pintle at each end of the bottom edge portion of said front wall, and said latch means for holding the baby seat front wall in its said upright, closed position includes at least one cammed latch member that moves said front wall upward when it approaches its said closed position as it is swung up from its said open position, and then drops said front wall down to seat it in its said closed position.

10. The shopping cart of claim 9 in which said at least one cammed latch member is carried by said baby seat front wall and a cooperating slide member is provided at the front end of the corresponding side wall of the baby seat.

11. The shopping cart of claim 10 in which a cammed latch member is carried by said baby seat front wall at each end thereof and a cooperating slide member is provided at the front end of the respective side wall of the baby seat.

12. The shopping cart of claim 1 in which:

said baby seat is fabricated separately from the remainder of the cart, at least one end of the hinge pintle at the bottom edge portion of the front wall of the baby seat includes a stud extending transverse to the longitudinal axis of said pintle, said hinge includes means defining an elongated slot to receive said at least one stud, and means are provided at the other end of said hinge pintle from said stud to prevent movement of the stud out of said slot after said pintle has been seated therein and the baby seat is fixedly secured to said shopping cart frame.

13. The shopping cart of claim 12 in which:

the pintle of said hinge at the bottom edge portion of the baby seat front wall is carried by said front wall, each end of said pintle carries a stud extending transverse to the longitudinal axis of said hinge pintle, and away from the bottom edge of said front wall at an obtuse angle to the plane of said wall, and each baby seat side wall carries an elongated slot to receive the stud carried by said pintle end, said slot being narrower than the length of said stud.

14. The shopping cart of claim 13 in which each of said studs extends away from the bottom edge of said baby seat front wall at an angle of about 135° to the plane of said wall.

15. The shopping cart of claim 13 in which said elongated slots to receive said studs on said hinge pintle are oriented generally vertically to serve as part of a lost motion hinge for said baby seat front wall.

16. The shopping cart of claim 15 in which said latch means for holding the baby seat front wall in its said upright, closed position includes at least one cammed latch member that moves said front wall upward when it approaches its said closed position as it is swung up from its open position, and then drops said front wall down to seat it in its said closed position.

17. The shopping cart of claim 16 in which said at least one cammed latch member is carried by said baby seat front wall and a cooperating slide member is provided at the front end of the corresponding side wall of the baby seat.

18. The shopping cart of claim 13 in which:

said basket that defines the main lading-carrying space of the cart has an operative position and a storage position, said bottom wall of the basket is pivotally secured at its rear end portion to said elevated frame to rest on the front portion of said frame when the basket is in its said operative position, the bottom wall of said basket is generally at the level of the bottom wall of said baby seat when the basket is in its operative position, and the side walls of said lading-carrying basket are spaced more widely than the side walls of said baby seat, so that the basket can be pivoted from its said operative position upward about its hinge approximately 90° to its said storage position, in which position the basket bottom wall is generally upright and the baby seat is nested within the basket.

19. The shopping cart of claim 13 in which the side walls of said baby seat slant upwardly and outwardly.

20. The shopping cart of claim 1 in which portions of said baby seat front wall extend rearward of the cart adjacent the two opposed side walls of the baby seat and outwardly thereof, to provide rigid stops restricting outward lateral movement of said baby seat side walls.

21. The shopping cart of claim 1 in which said hinge at the bottom edge portion of the front wall of the baby seat is a lost motion hinge including an elongated slot oriented generally vertically.

22. A shopping cart which comprises:

(a) a wheeled chassis;

(b) an elevated frame carried by said chassis;

(c) a basket defining a main lading-carrying space, said basket including a bottom wall secured to said elevated frame, two opposed side walls, and a gate at the front end of said cart, and having an open end at the rear thereof, said basket having an operative position and a storage position, the bottom wall of the basket being pivotally secured at its rear end portion to said elevated frame to rest on the front portion of said frame when the basket is in its said operative position;

(d) a baby seat compartment secured to the rear portion of said elevated frame, said baby seat including a bottom wall, two opposed side walls, a front wall having an upright, closed position and an open position, the width of said baby seat front wall being less than the width of said lading-carrying basket [but greater than the distance between said baby seat sidewalls], said front wall having at its bottom edge portion a hinge to permit said wall to be swung down from its closed position in the forward direction, when desired, to rest on the bottom wall of said lading-carrying basket said hinge for said baby seat front wall being located at a level at least as high as the bottom wall of said lading-carrying basket, said hinge being a lost motion hinge including an elongated slot at each end of the bottom edge portion of said front wall, said slots being defined by means carried by each baby seat side wall and oriented in a generally vertical position, and pintle means carried by said baby seat front wall, said pintle having at each end thereof a stud extending at about 90° to the longitudinal axis of said pintle and away from the bottom edge of said front wall at an angle of about 135° to the plane of said wall, and a rear wall defining two openings to receive the legs of a baby seated in said baby seat; and (e) latch means for providing a positive holding of said baby seat front wall to secure the same against movement in either the forward or rearward direction from its said upright, closed position while a baby is seated in the seat, said latch means including at least one cammed latch member carried by said front wall that slides across a cooperating member carried by a side wall of said baby seat to move said front wall upward when it approaches its said closed position as it is swung up from its open position and then drop said front wall down to seat it in its said closed position, said latch means being releasable when it is desired to swing said front wall down to rest on the bottom wall of said basket to increase the lading-carrying capacity of the shopping cart.

* * * * *

UNITED STATES PATENT AND TRADEMARK OFFICE

CERTIFICATE OF CORRECTION

PATENT NO. : Re. 32,453

DATED : July 7, 1987

INVENTOR(S) : Don A. Stover, Clarence W. Upshaw and Warren N. Norman

It is certified that error appears in the above-identified patent and that said Letters Patent is hereby corrected as shown below:

Col. 2, line 23, delete " [. "; line 24, delete " ] ".

Col. 7, lines 40-42, delete the words and heavy brackets, " [said hinge for said baby seat front wall being located at a level at least as high as the bottom walls of said lading-carrying basket,] " and substitute the words and heavy brackets, [but greater than the distance between said baby seat side walls,] , --.

Col. 7, lines 47-49, delete the italicized words "<u>said hinge for said baby seat front wall being located at a level at least as high as the bottom wall of said lading-carrying basket</u>" and substitute the same words in conventional type to read -- said hinge for said baby seat front wall being located at a level at least as high as the bottom wall of said

UNITED STATES PATENT AND TRADEMARK OFFICE

CERTIFICATE OF CORRECTION

PATENT NO. : Re. 32,453

DATED : July 7, 1987

INVENTOR(S) : Don A. Stover et al

It is certified that error appears in the above-identified patent and that said Letters Patent is hereby corrected as shown below:

lading-carrying basket --.

Signed and Sealed this

Twenty-sixth Day of April, 1988

*Attest:*

DONALD J. QUIGG

*Attesting Officer*

*Commissioner of Patents and Trademarks*